(12) United States Patent
Somasundaram et al.

(10) Patent No.: US 11,522,899 B2
(45) Date of Patent: Dec. 6, 2022

(54) SYSTEM AND METHOD FOR VULNERABILITY MANAGEMENT FOR CONNECTED DEVICES

(71) Applicant: Asimily, Inc, Sunnyvale, CA (US)

(72) Inventors: Shankar Somasundaram, Sunnyvale, CA (US); Hithesh Nama, Sunnyvale, CA (US)

(73) Assignee: Asimily, INC., Sunnyvale, CA (US)

( * ) Notice: Subject to any disclaimer, the term of this patent is extended or adjusted under 35 U.S.C. 154(b) by 792 days.

(21) Appl. No.: 16/370,972

(22) Filed: Mar. 30, 2019

(65) Prior Publication Data

US 2019/0238584 A1 Aug. 1, 2019

Related U.S. Application Data

(60) Provisional application No. 62/624,084, filed on Jan. 30, 2018.

(51) Int. Cl.
*H04L 9/00* (2022.01)
*H04L 9/40* (2022.01)
*G06F 21/55* (2013.01)

(52) U.S. Cl.
CPC .......... *H04L 63/1433* (2013.01); *G06F 21/55* (2013.01); *H04L 63/20* (2013.01)

(58) Field of Classification Search
CPC ...... H04L 63/1433; H04L 63/20; G06F 21/55
USPC .......................................................... 726/25
See application file for complete search history.

(56) References Cited

U.S. PATENT DOCUMENTS

| 10,963,571 | B2 * | 3/2021 | Bar Joseph ......... G06F 21/6245 |
| 2006/0095961 | A1 * | 5/2006 | Govindarajan ..... H04L 63/1416 726/15 |
| 2007/0180107 | A1 * | 8/2007 | Newton .............. H04L 63/1425 709/224 |
| 2017/0098087 | A1 * | 4/2017 | Li ....................... H04L 63/1433 |
| 2018/0136921 | A1 * | 5/2018 | Pfleger de Aguiar . G06Q 10/06 |
| 2018/0189697 | A1 * | 7/2018 | Thomson ............ H04L 63/1408 |
| 2019/0230098 | A1 * | 7/2019 | Navarro .................. G06F 21/55 |

\* cited by examiner

*Primary Examiner* — Christopher J Brown

(57) ABSTRACT

Embodiments herein provide a system, method and an apparatus for vulnerability management for connected devices on a network. The proposed method includes identifying vulnerability in a device. The method includes determining whether the vulnerability affects the device by applying one or more rules. Further, the method includes calculating vulnerability score by assigning weights to impact metric and exploitability metric. In various embodiments, the method includes predicting security incident for the device based on the computed vulnerability score, security capabilities of the device and various anomalies on the device.

22 Claims, 11 Drawing Sheets

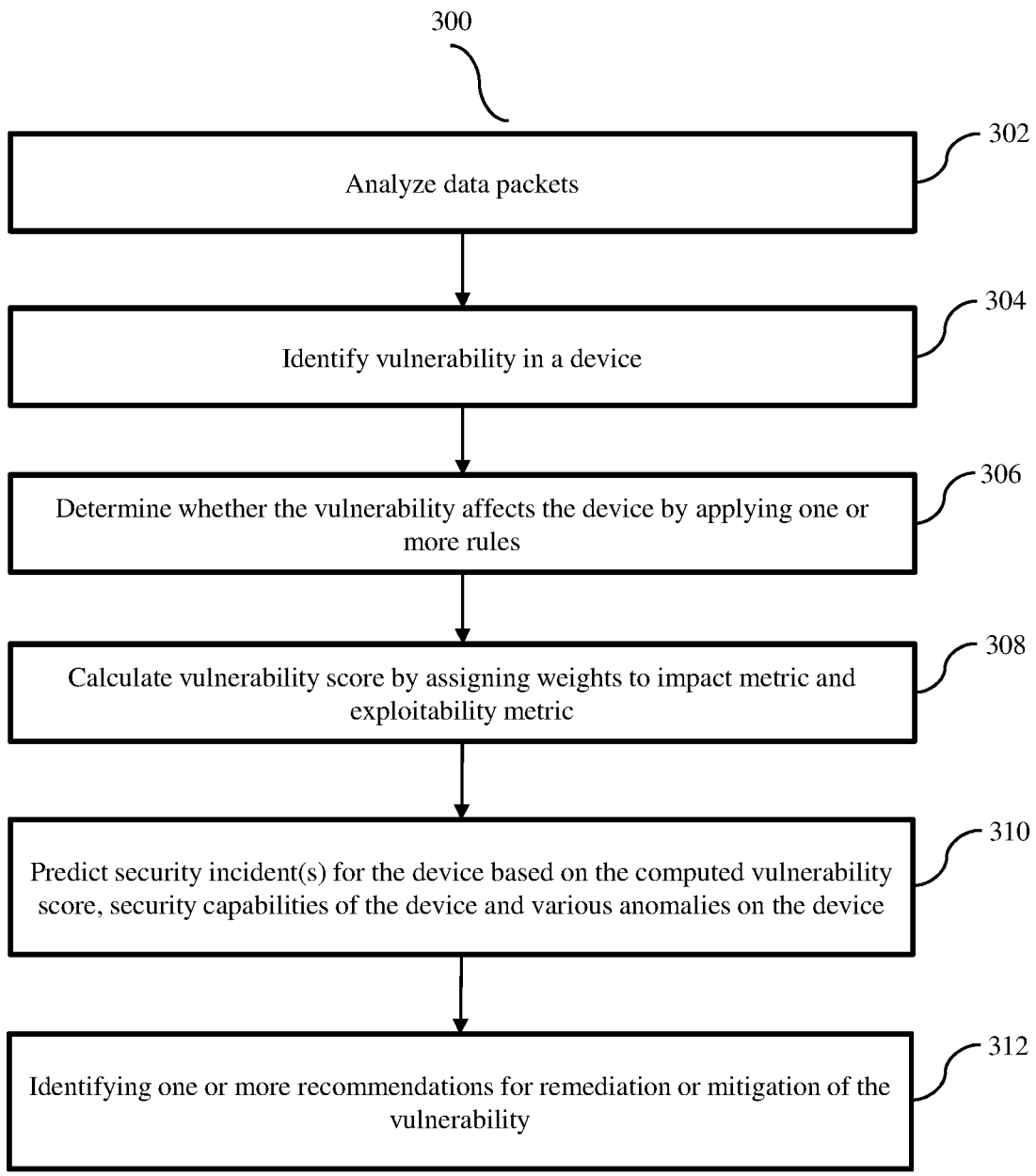

SYSTEM AND METHOD FOR VULNERABILITY MANAGEMENT FOR CONNECTED DEVICES

This application claims the benefit of U.S. Provisional Application No. 62/624,084, filed Jan. 30, 2018.

TECHNICAL FIELD

The present invention relates generally to vulnerability management, and more particularly relates to a system and method for vulnerability management for connected devices on a network.

BACKGROUND

Vulnerability in a system may be defined as a weakness in a sub-system, asset, process, or a violation of a policy or an industry standard to which the system is designed to adhere to, which may be exploited to compromise security of the system. And, vulnerability management involves identifying, classifying, remediating, and mitigating vulnerabilities. Vulnerability management systems use some form of scoring to identify and classify vulnerabilities before taking necessary actions.

The Common Vulnerability Scoring System (CVSS) is an industry standard for assigning a score to the computing system security vulnerabilities. The score is computed based on various metrics such as base metrics, temporal metrics and environmental metrics. The base metrics represent the intrinsic characteristics of the vulnerability which are constant over time. Further, the base metrics is composed of two sets of metrics namely exploitability metrics and impact metrics.

The exploitability metrics indicate the means by which the vulnerability can be exploited, on the other hand, the impact metrics reflect the direct consequence of a successful exploit, which is referred as the impacted component.

For general computing systems, such as computers, laptops and servers, where every device is considered exploitable, the impact metric is generally weighted more than the exploitability metrics to compute the vulnerability score. However, for connected devices in enterprise environments such as medical devices, industrial devices and other reporting devices, the existing mechanisms for computing vulnerability score does not account for vulnerability exploit factors and context of devices such as device configuration, device impact and other factors indicating topology of the connected devices.

Therefore, with increase in number of connected devices, vulnerability management systems need to adapt and change the way in which they assess and mitigate associated risks.

The above information is presented as background information only to help the reader to understand the present invention. Applicants have made no determination and make no assertion as to whether any of the above might be applicable as Prior Art with regard to the present application.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which:

FIG. 3 is a flow chart illustrating a method for vulnerability management for connected devices on a network, according to an embodiment of the present invention;

DETAILED DESCRIPTION OF INVENTION

Figure 1:
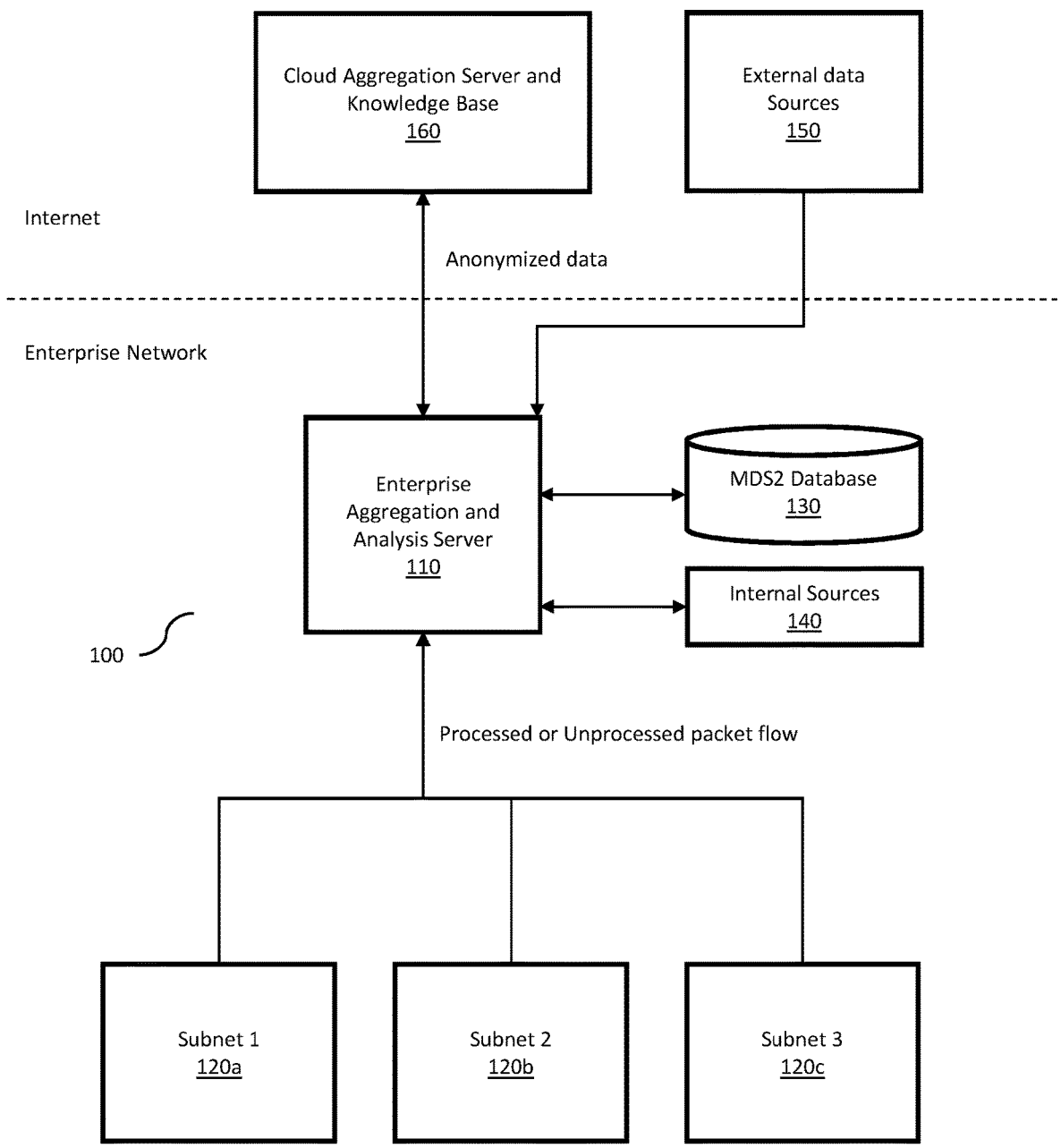
FIG. 1 illustrates a system architecture, according to one embodiment of the present invention.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is tradition in the field, embodiments may be described and illustrated in terms of blocks which carry out a described function or functions. These blocks, which may be referred to herein as managers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein achieve a system, method and an apparatus for computing vulnerability management for connected devices on a network.

In a preferred embodiment, the method for vulnerability management includes identifying vulnerability in a device. In an embodiment, identifying vulnerability involves collecting and/or sniffing data packets flowing in the network to understand the nature of information flowing to and from the devices in the network. Such information is used to correlate with available vulnerability information (publicly available in the form of various published documents and privately collected information) to determine vulnerabilities affecting one or more devices in the network.

The method further includes determining whether the vulnerability affects the device by applying one or more rules. In various embodiments, rules can include pre-defined rules and dynamically added rules. Pre-defined rules may be added by experts or system administrators aware of behaviors of devices that can result in devices being affected by certain vulnerabilities. Rules can also be automatically added by parsing and extracting information from published documents and other organized or unorganized sources. In various embodiments, rules may be updated on a regular basis based on updated information from various sources.

Further, the method includes calculating vulnerability score for each vulnerability by considering one or more parameters related to impact and exploitability. The vulnerability score suggests likelihood of occurrence of security incidents related to the vulnerability.

The one or more parameters may include device impact and other environmental factors for computing the vulnerability score. The device impact can be determined based on the usage of the device for various purposes. For example, medical devices can impact on patient care, data (whether the device stores or transmits patient data) and business/operations impact (what would be the impact on business or operations if a device stops functioning). In some instances, a single device of a type can be critical for business at a given time but could become less critical when more devices of the same type are added to the environment.

The environmental factors include one or more aspects such as how the device is connected in the network. For example, if the device is connected such that it is hard to access over the network, then the device is better protected than a device which is more easily accessible remotely over the network. These environmental factors are considered for computing the vulnerability score. Thus, the afore-mentioned factors are combined to compute the vulnerability score.

In an embodiment, the impact metric and exploitability metric are equally weighted in computing the vulnerability score.

In case of general computing devices such as laptops and servers, where every device is considered exploitable, the impact metric is generally weighted more than the exploitability metric. However, in the connected devices in enterprise environments such as medical devices, industrial devices and other reporting devices, the exploitability metric plays an equally important role. Thus, the proposed system and method equally prioritizes the impact and the exploitability metrics for computing the vulnerability score.

The proposed system and method can be used to detect whether the vulnerability impacts the device based on device configuration and exploitability vectors. The proposed system and method consider the device impact on patient data, business/operations impact and other environmental factors which indicate the topology of network in which the device is connected and so on for computing the vulnerability score. Further, the proposed method can be used for calculating likelihood of a device having a security incident based on computed vulnerability score.

The method further involves computing a likelihood score for a device based on vulnerabilities identified for the device. In various embodiments, likelihood score involves averaging vulnerability score for all vulnerabilities identified for the device. When device has certain mitigating factors already applied to it (for example, malware protection software), a security posture metric factor (typically, less than one) is applied to account for measures already taken on the device to counter any relevant vulnerabilities. The likelihood score then becomes the product of applying security posture metric factor and average vulnerability score.

Still further, in various embodiments, the method involves identifying anomalies. The set of anomalies identified can be from a list of pre-defined anomalies or can be based on information extracted from sources available in public domain and in private databases. The anomalies identified are each assigned an anomaly score. For example, each anomaly can be classified as HIGH, MEDIUM or LOW category anomaly. And, based on the criticality of the anomaly, a pre-defined score may be assigned for each of the categories of the anomaly. The score will be applied to anomalies based on the category score. The anomaly scores are then used to derive an overall anomaly score for the device. In an example, the overall score can be average of the anomaly scores.

Furthermore, the method, in various embodiments, includes predicting security incidents for the device based on the computed vulnerability score, security capabilities of the device and various anomalies on the device. This can involve computing a risk score for the device using the likelihood score and the anomaly score for the device. In one embodiment, risk score can be the maximum value out of the two values: likelihood score for the device and anomaly score for the device. The risk score is used to determine the risk level posed and based on the risk score, determination is made if security incidents relating to the vulnerabilities and anomalies are likely to occur or not. In one embodiment, the determination can be based on a pre-defined threshold value of risk score. For example, if the risk score crosses a pre-defined threshold value, then it may be deemed that all security incidents relating to the vulnerabilities and anomalies are highly likely. And, therefore, such security incidents may be included as part of prediction.

In some other embodiments, the risk score may be computed by using weights for likelihood score and anomaly score, as appropriate to the situation. For example, equal weights (a factor of 0.5 for each value) may be used to compute the risk score.

In some embodiments, the system can be configured to recommend measures for remediation or mitigation (for example, using workaround solutions) of vulnerabilities based on the risk level (suggested by the risk score), the overall risk, and additional factors that are associated with the device. In some embodiments, the proposed system can be configured to automatically mitigate risk for some devices. For example, the system can mitigate risk of being affected by a malware by disabling connectivity to the relevant device.

In various embodiments, automatic mitigation of risks can be configurable. For example, users of the system can specify if automation mitigation of risks is accepted for a specific device or for a specific group of devices. In some embodiments, the default behavior can be to mitigate risks, where possible, automatically. In some other embodiments, the default behavior can be to mitigate risks automatically (for a device or a group of devices) only after receiving specific permissions from the users of the system.

The proposed system, in various embodiments, can be configured to notify a user of the vulnerabilities identified and risk assessment for devices. For example, the system can be configured to provide a report to a user that includes the overall risk. The report can include the identity of the device, the identified vulnerabilities, the vulnerability scores, recommended remediation or mitigation measures, the risk level as suggested by risk score, the overall risk to the network based on individual device risk scores, and other relevant information. The proposed system can be configured to provide the report in any format that is accessible by the user. For example, the security tool 102 can be configured to create and output a Graphical User Interface (GUI) that includes the report. The system can be configured to generate report documents to send via email or other well-known messaging means to the users, as requested. In various embodiments, the report requests can be made available via a graphical user interface provide through a web-based application. In various embodiments, the reports can be configured to be generated automatically on a periodic basis. Further, the report contents can also be customized based on user preferences. For example, a user interested in only reviewing the overall risk for any given device and not interested in reviewing individual device level vulnerabilities can choose to include only overall risk score in the report. Furthermore, a user can choose to configure different reports with varying reporting needs and with reporting frequency. For example, a user can choose to get a report with new vulnerabilities as and when new vulnerabilities are identified and choose to get another report on all vulnerabilities in the network on a daily or weekly basis based on his/her needs.

In various embodiments, the proposed method and system allows risk management by prioritizing certain devices based on different criteria. The criteria can include but is not limited to certain high priority vulnerabilities affecting the device, and the risk score crossing a certain threshold. After identifying the devices with high risk, the likelihood scores are first calculated for such high priority to identify devices having a high likelihood of having a security incident. This is to ensure the system reacts to immediate threats quickly.

In some embodiments, the cause for high risk of the device is identified based on list of vulnerabilities identified for the device which are determined while computing the vulnerability score. One or more measures can be taken to remediate or mitigate the vulnerability through a patch or through configuration changes for the device.

In some embodiments, configuration changes, either for prioritized devices or otherwise, can involve changing network configuration for one or more devices such that devices are isolated from other parts of the networks, by way of moving the devices to an independent virtual local area network (VLAN) or even completely isolating the devices from the rest of the network by way of disabling connectivity. Such network configuration changes may be achieved by connecting to network management tools through their application programming interfaces (APIs).

In some embodiments, configuration changes can involve changing device specific configuration to allow or disallow certain functions. For example, if it is determined that a device may be transmitting confidential patent information, configuration change may involve turning off functionality to transmit data. Such configuration changes may be achieved by connecting to centralized management systems for such devices.

The proposed method and system can be used to evaluate a device and a vulnerability on the device (by considering device configuration, exploit vectors, device impact on patient, privacy and business, topology, security configuration and posture) and to determine which devices are critical and really at risk and within those devices and to further determine which of the vulnerabilities need a patch. Thus, the proposed method and system allows remediation of the vulnerabilities by patching only a subset of devices which reduces cost and improves operational efficiency of the devices.

Referring now to the drawings, and more particularly to FIGS. 1 through 6, there are shown preferred embodiments.

FIG. 1 illustrates system architecture 100, according to one embodiment of the present invention.

The system includes an Enterprise Aggregation and Analysis Server (EAAS) 110, a set of one or more subnets (120a, 120b, 120c) with each subnet having one or more devices, an MDS2 (Manufacturer Disclosure Statement) database 130 to look up medical device security information, a variety of internal sources 140 to look up information including but not limited to sources with data relating to CMMS, vulnerability scan information, SIEM, LDAP, network meta-data, and domain specific protocols, a set of online external data sources 150 to look up information including but not limited to sources with data relating to manufacturer databases, vulnerability databases such as NVD (National Vulnerability Database) and ICS CERT, FDA (Food and Drug Administration) databases such as FDA recall database and FDA classification database, and a cloud aggregation server and knowledge base containing aggregated data across the networks, the data stored including but not limited to various risks detected, mitigation and remediation methods, and domain-specific and domain-agnostic rules.

Each of the subnets may include various connected devices. For example, the subnet 1 can include a plurality of devices such as Internet of Things (IoT) devices including but not limited to surveillance cameras (i.e., either analog or digital cameras for capturing video/audio data). And, the subnet 2 can include various Internet Protocol (IP) devices used in a hospital for monitoring patient information. Further, the subnet 3 can includes IP devices, for example computing devices used by administrative staff not involved in medical practice. Each of the Device networks is connected to the network to which the EAAS belongs. It should be noted that these subnets (1, 2 and 3) can be connected either directly or indirectly to the network The EAAS 110 monitors the status, and network connectivity of all devices or components. The EAAS 110 can be configured to identify vulnerabilities in any of the device and determines a risk level or criticality of the vulnerabilities by calculating the vulnerability score for the device. The vulnerability in the device can be any type of bug, glitch in the software resources or hardware resources of the device which can allow the security of the device to be compromised. For example, vulnerability in the software resources can include, for example, software that is out of date, software that has known security weakness, known bugs of software and so on. The vulnerability in the hardware resources can include, for example, known bugs in hardware, configurations of hardware that have known security weaknesses and so on.

The EAAS identifies vulnerability of device(s) in various subnets and determines whether the vulnerability affects the device(s) by applying one or more rules and calculates vulnerability score by assigning equal weights to impact metric and exploitability metric, to predict security incident for the device(s).

The EAAS 110 can be configured to communicate with one or more servers (for example, server 1, server 2 and so on to server N) for obtaining vulnerability information. In an embodiment, if the Device 3 is a medical device, then the network management node 130 communicates with the server 2 for obtaining the vulnerability information associated with the Device 3. In another embodiment, if the Device 1 is a surveillance camera, then the network management node 130 communicates with the server 1 for obtaining the vulnerability information associated with the Device 1. Thus, the network management node 130 can be configured to communicate with the corresponding server based on the type of the device for obtaining the vulnerability information.

Figure 2A:
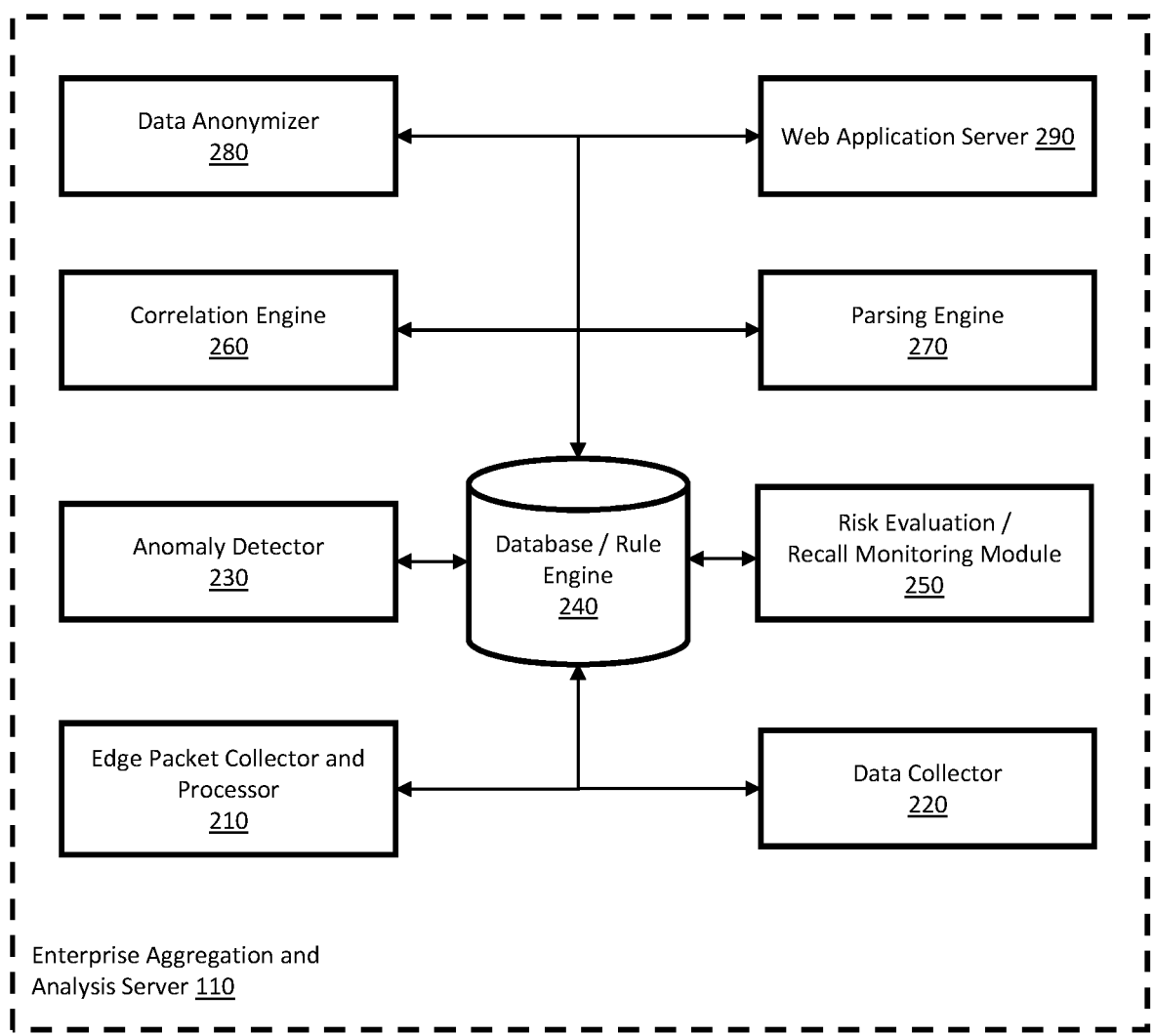
FIG. 2A and FIG. 2B are block diagrams illustrating the various sub-components of building blocks from FIG. 1, according to one embodiment of the present invention
Figure 2B:
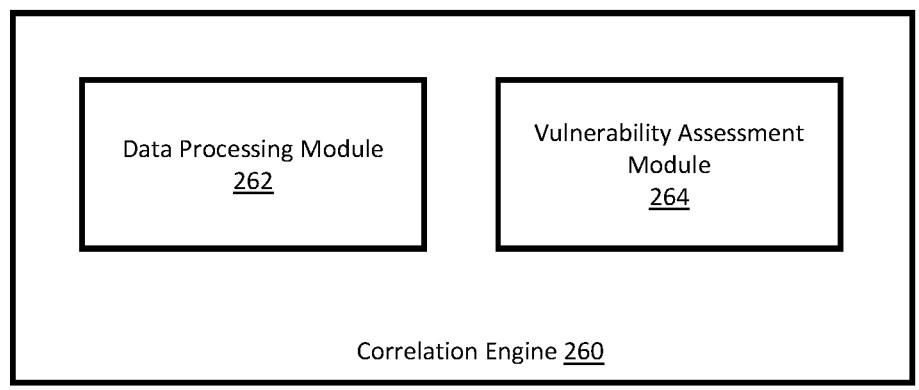

The EAAS, as illustrated in FIG. 2A, includes an Edge Packet Collector and Processor (EPCP) 210 to receive packets coming from devices in the various subnets and process them to convert information from the packets received to an applicable standardized form before handing it over to the Data Collector module 220. The data received may include identifying information about device, vulnerability information, protocol information, application/services information, information identifying operating system of device, software and version information, and so on. In various embodiments, the standardized form for each of the different types of data may vary.

In some embodiments, EAAS 110 can collect raw data from the devices in the various subnets by way of forwarding packets from a gateway. In such embodiments, all packets or specific packets based on filter rules (by port, protocol, specific hosts etc.) can be forwarded to the EAAS.

The EAAS includes a Correlation Engine 260 (further illustrated in FIG. 2B) to correlate pieces of information about devices to identify devices and associate vulnerability information with appropriate devices, and a Parsing Engine 270 for parsing various documents and messages as required by the correlation engine and other modules. The information associated with a device includes various characteristics of the device such as MAC/IP addresses, manufacturer, operating system, applications with versions, and topology of each device that indicates how the device is connected on the network. In various embodiments, the device information may be obtained by processing protocol specific messages, port numbers and associated protocol services, hostname field in DHCP messages, and so on.

Correlation—Data Processing

The information relating to devices (identifying information, vulnerability information etc.) may arrive in bits and pieces as and when available, in unpredictable order. The correlation engine 260, with the help of data processing module 262 checks the database on a periodic basis to find updates regarding device information and correlates such information to coherently organize information for a device.

In some embodiments, the correlation engine 260 obtains OUI extracted from MAC address to identify device manufacturer. For medical devices, using HL7 medical protocol, each message consists of multiple segments and the first of which is the message header (MSH) segment. The correlation engine 260 utilizes the MSH segment, which contains sender and receiver application fields, that can provide information about device model. Further, a Product Detail Country (PDC) segment is present in certain HL7 message and contains information about the manufacturer, brand name, generic name, product code and model ID among other things. Thus, the correlation engine can use information obtained through different means to determine device type based on usage of the device based on the applications running on it.

In some embodiments, the correlation engine 260 can identify OS of the device by parsing a request message which includes one or more request headers in communication with the parsing engine. The parsing engine parses relevant request message to identify information about the OS name, OS version, browser name, browser version and platform name (x86, PowerPC, ARM etc.) and so on. Further, various protocols like SMB can be used to determine the version number of the OS.

In some embodiments, the correlation engine 260 can use one or more DHCP options contained in the DHCP messages for identifying the OS. Further, the correlation engine 260 can use TCP/UDP port numbers which can be mapped to known protocol services. The correlation engine 260 can also identify the version number of the OS by parsing these protocols in communication with the parsing engine.

In some embodiments, the correlation engine 260 extracts codes with the help of the parsing engine 270 to determine the version number of the OS. For example, FTP protocol messages consist of request/response messages which contain commands and replies to the commands. The reply codes include information which can be used to identify the end-point OS and applications that are used for these services.

Further, in some embodiments, the correlation engine 260 can determine applications on the device(s) using one or more protocols. For example, MySQL protocol includes information about the MySQL application and version associated with it.

Correlation—Vulnerability Assessment

In trying to identify devices and associate devices with vulnerabilities, the correlation engine 260, with the help of vulnerability assessment module 264, may on a periodic basis fetch information from internal sources, MDS2 database, external sources, and the centralized cloud aggregation server for additional information that may not be captured through network packet capture and monitoring. Further, the correlation engine 260 may also check for known vulnerabilities recorded in the local database. The vulnerability information in the local database may be persisted as and when a new vulnerability is ascertained through correlation process. Further, vulnerability information may also be synced from the central cloud aggregation server which has information regarding vulnerabilities obtained from other networks for similar devices or software systems that are part of this network.

The data organized in the various sources may include both unstructured and structured form. The parsing engine is configured to parse both structured data (for example, JSON and XML documents with pre-determined fields) and unstructured data (for example, PDF and WORD documents with free format text).

The correlation engine 260 relies on the parsing engine 270 for parsing documents from various sources before device information and vulnerability related correlation is performed. In various embodiments, the parsing engine 270 can parse various vendor documents like MDS2 by device manufacturers. These documents can contain detailed information about security posture and capabilities of the device which is useful in identifying the security risk for the device. These documents typically follow a standard format (typically, with a combination of structured and unstructured data in different sections) and are typically stored in PDF format. In an embodiment, the parsing engine 270 utilizes one or more techniques/tools capable of parsing the PDF documents like MDS2 and persists the data into the database for risk analysis.

Further, the parsing engine 270 can utilize one or more document extractor tools for parsing PDF documents. The parsing engine 270 can parse PDF documents and extract individual text characters and associated coordinates within a page of the PDF document. Further, the parsing engine can transform individual characters into words and compute word coordinates accordingly. For example, in case of MDS2, device description section includes a JSON structure which contains each category label and a description of the rectangular box for that category, described using the neighboring category labels—left, right, top, and bottom. The coordinates of each category label are identified using the word coordinates. Further, the coordinates of the neighboring category labels then define the boundary of the rectangular box. The text within these boundary coordinates is associated with the corresponding category label. For example, a Manufacturer category is bounded by Device Category on the left, Document ID on the right, Device description on the top and Software Revision at the bottom.

The parsing engine 270 can utilize query strings from the database, search for device parameters within the document, and fetch the response which can indicate presence of requested information (i.e., the response can be either YES/NO/Not Applicable). In some embodiments, the parsing engine 270 can obtain corners, beginning, end of each section and other document parameters from the database for parsing the document.

In various embodiments, the correlation engine 260, apart from correlating information received through internal packet capture and processing, can also correlate the identified information with the device information obtained from various data sources. For example, some of the data sources use device model and serial number to uniquely identify a device, while some other sources may only identify devices based on the device category and some other source may use network parameters like MAC address or IP address. The same device model name may be entered in different ways in different sources. In such scenarios, the correlation engine can be configured to correlate the information from various sources through contextual pattern matching to uniquely identify the information about the device type, device model, OS, applications, services, asset utilization and so on.

In various embodiments, the correlation engine 260 utilizes one or more pattern-matching techniques (to reduce false positives) for matching the manufacturer and device model information from one source with similar information from another source. For example, in a healthcare context, manufacturer and device model is identified using medical network protocols like HL7 or DICOM which is matched with similar information from FDA recall database. The correlation engine uses contextual string matches to search for the device model within one or more fields in the FDA recall database which are not exclusively meant to include the device model. In an embodiment, the correlation engine 270 can be configured to provide appropriate weightage for partial matches and/or word position matches to determine match scores which can be ordered to find a best match.

In an embodiment, when the software and hardware resources of the device(s) are identified, the EAAS 110 can be configured to compare the details of the software resources and the details of the hardware resources to the database/rule engine 240. The database/rule engine 240 can be configured to store a record of known vulnerabilities for various types of known software resources and hardware resources.

The database/rule engine 240 can be configured to create one or more rules for every vulnerability that defines the way the vulnerability can be exploited for the device (in an environment). For example, the rule engine 240 can create a rule which states that the vulnerability might only be exploitable if the device browses the Internet. In another example, the vulnerability might be exploitable when the device receives a message. Thus, the rule engine 240 creates rules using vulnerability exploit vectors for every vulnerability of the device.

In an embodiment, vulnerability is considered to affect the device when the rule is met for the device. For example, if the rule is that the vulnerability only affects the device, if the device is browsing the Internet, then the vulnerability would only affect the device if the device browses the Internet. In all other cases the vulnerability would not be considered as affecting the device.

Risk Evaluation

The EAAS includes Risk evaluation and recall monitoring (RERM) module configured to evaluate criticality of the vulnerability by computing the vulnerability score. In an embodiment, the RERM 250 can be configured to evaluate criticality of the vulnerability by providing equal weights to the impact metric and the exploitability metric for vulnerability computation.

In case of general computing devices such as laptops and servers, where every device is considered exploitable, the impact metric is generally weighted more than the exploitability metric. However, in the connected devices in enterprise environments such as medical devices, industrial devices and other reporting devices, the exploitability metrics plays an equally important role. Thus, the proposed system and method equally prioritizes the impact and the exploitability metrics for computing the vulnerability score.

In an embodiment, the RERM 250 considers the device impact and other environmental factors for computing the vulnerability score. The device impact can be determined based on the usage of the device for various purposes. For example, medical devices can impact on patient care, data (whether the device stores or transmits patient data) and business/operations impact (what would be the impact on business or operations if a device stops functioning). In some instances, a single device of a type can be critical for business at a given time but could become less critical when more devices of the same type are added to the environment.

The environmental factors include one or more aspects such as how the device is connected in the network. For example, if the device is connected such that it is hard to access over the network, then the device is better protected than a device which is more easily accessible remotely over the network. These environmental factors are considered for computing the vulnerability score. The various steps involved in computing the vulnerability score by assigning equal weights to the impact metric and the exploitability metric are described in the later parts of the description.

It should be noted that the RERM 250 can be configured to compute the vulnerability score using rules and techniques that define how each factor will be used and weighed to compute the vulnerability score. The RERM 250 can utilize any types of rules, and any weight for the factors for the identified vulnerability.

The RERM module 250 is responsible for evaluating risk associated with devices for which information is available. The RERM module is also responsible for checking with external sources regarding FDA recall for devices that are identified by the EAAS 110.

The RERM module 250 can evaluate security incident or risk associated with a device already identified by EAAS 110. More specifically, the RERM module 250 determines devices which are likely to be affected in the network and identifies the causes for the risk. Further, the RERM module 250 can identify the devices that have the most impact on the network due to the risk posed. For example, in case of healthcare, the RERM module 250 determines the Device network (i.e., the subnet to which the device belongs) which has impact on patient care or patient data. The RERM module 250 can further prioritize the risk level for each of the devices based on the impact of the device.

Further, in various embodiments, the RERM module 250 can correlate the risk level for each device by obtaining risk information of various devices across subnets to identify issues from one subnet and assess impact on similar devices in other subnets for managing security and operational risks. Similarly, the RERM module 250 can also obtain information from central cloud server regarding risks associated with similar devices that are identified by EAAS 110 and correlate information to assess and identify potential risks and prioritize such risks.

In various embodiments, when risk level associated with a device is determined, RERM module 250 can notify one or more users (as configured) of the overall risk. For example, RERM module 250 can send a report in an email, where the report includes information relating to the risk, the causes and the potential impact of the risks. More specifically, in an example embodiment, the report can also include the identity of the device, the identified vulnerabilities, the risk level, the overall risk, and other relevant information.

In some embodiments, the RERM module 250 can determine a remediation based on the risk level, the overall risk, and additional factors that are associated with the device. For example, the RERM module 250 can mitigate that risk which is above a determined risk threshold.

Anomaly Detection

The EAAS 110 also includes an anomaly detection module 230. The anomaly detector 230 can continuously monitor the devices for detection of one or more anomalies. In some embodiments, the anomaly detection module can detect one or more anomalies in devices when a device is exhibiting abnormal behavior compared to a normal behavior (i.e., a baseline behavior). Further, the anomaly detection module 230 can identify causes for the abnormal behavior of the device and evaluate whether the abnormal behavior of the device is due to an operational issue or a security breach. Furthermore, the operational behavior of every device can be compared across subnets and across networks (with the help of cloud server) to identify and predict various anomalies associated with devices.

The anomaly detection module 230 prompts the RERM module 250 for any new anomalies so that RERM module 250 can conduct risk evaluation and prioritization before taking any actions.

Web Console

The EAAS 110 includes a web application server, which runs a web application. The web application can be used to interact with the EAAS 110 to identify risks, view vulnerabilities in the network of interest, define and view reports, take remediation measures in a pro-active manner and so on.

Data Anonymization

The EAAS includes a data anonymizer 280, which anonymizes data before sending data to the cloud server. As described in various embodiments, the cloud server is used as a source of information about devices, and device vulnerabilities to cross correlation across Enterprise networks.

FIG. 3 is a flow chart 300 illustrating a method for vulnerability management for connected devices on a network, according to an embodiment of the present invention.

At step 302, the method includes analyzing data packets flowing through the network. The analysis of packets can be based on raw packets (for example, TCP packets) to extract relevant information as explained in various embodiments. The raw packets may be collected and analyzed by the EPCP module 210.

In some embodiments, the EAAS server 110 may connect to other packet processing tools such as CISCO NETFLOW, CISCO IPFLOW, ARUBA CLEARPASS POLICY MANAGER, SYLOG STREAM and so on, to gather information about devices.

In some other embodiments, EAAS server 110 can rely on both internal packet collection and analysis, and external tools.

At step 304, the method includes identifying vulnerability in the device. In an embodiment, the method allows the correlation engine 260 to identify the vulnerability in the device. At step 306, the method includes determining whether the vulnerability affects the device by applying one or more rules. In an embodiment, the method allows the rule engine 240 to create rules for each vulnerability that defines the way the vulnerability can be exploited for the device. In an embodiment, vulnerability is considered to affect the device when the rule is met for the device.

At step 308, the method includes computing vulnerability score by assigning weights to the impact metrics and the exploitability metrics. In an embodiment, the method allows the RERM module 250 to compute the vulnerability score by assigning equal weights to the impact metric and the exploitability metric.

At step 310, the method includes predicting the security incident for the device based on security capability of the device. In an embodiment, the method allows the RERM module 250 to predict the security incident for the device based on the computed vulnerability score, security capabilities of the device and various anomalies on the device. The various steps involved in predicting the security incident for the device is described in the FIG. 6A and FIG. 6B.

At step 312, the method includes identifying one or more recommendations including remediation and/or mitigation of the vulnerability. In various embodiments, the remediation and/or mitigation measures can be pre-defined (especially, for vulnerabilities that are pre-defined). Further, the remediation and/or mitigation measures can also be gathered from external published sources (both public and private) by way of parsing information and extracting relevant text. Further, in various embodiments, the EAAS 110 can allow users to enter specific remediation and/or mitigation measures for specific vulnerabilities. This can be done by users with necessary privileges (for example, system administrators) on the server.

The impact metric and exploitability metric are determined using the techniques mentioned CVSS standard, which are used to calculate final vulnerability score for the device on the network 120. The impact metric includes sub-metrics namely confidentiality metric, availability metric and an integrity metric which describes the impact on the device.

The impact metric is calculated based on the sub metrics (mentioned above) using the following equation (1).

$$\text{Impact Sub Score (ISC)} = W_i \times (\text{minimum}[[1-(1-\text{Confidentiality Impact (CI)} \times \text{Confidentiality requirement (CR)}) \times (1-\text{Integrity Impact (II)} \times \text{Integrity Requirement (IR)}) \times (1-\text{Availability Impact (AI)} \times \text{Availability Requirement (AR)})], 0.915]) \quad (1)$$

Figure 4A:
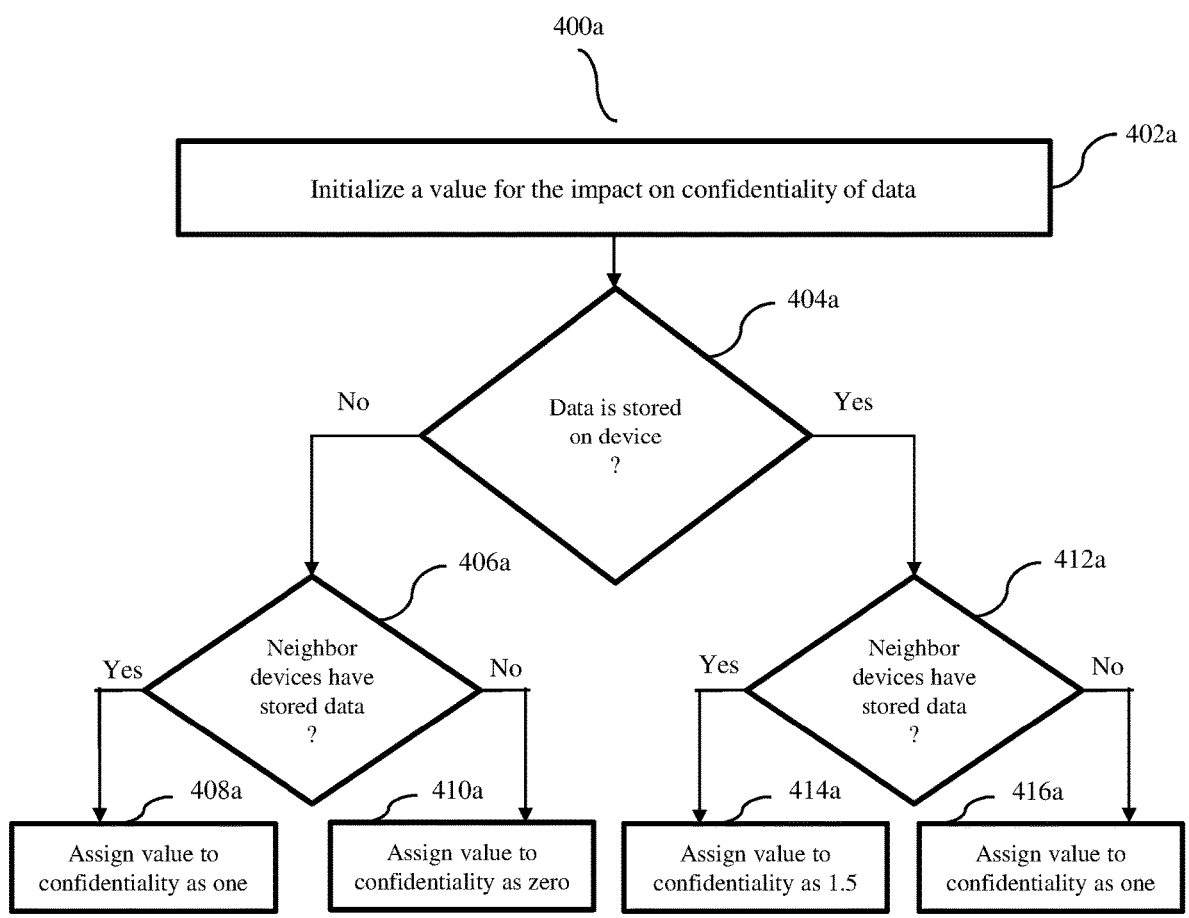
FIGS. 4A-4C are flow charts illustrating various steps involved in computing impact metric for calculating vulnerability score, according to an embodiment of the present invention.
Figure 4B:
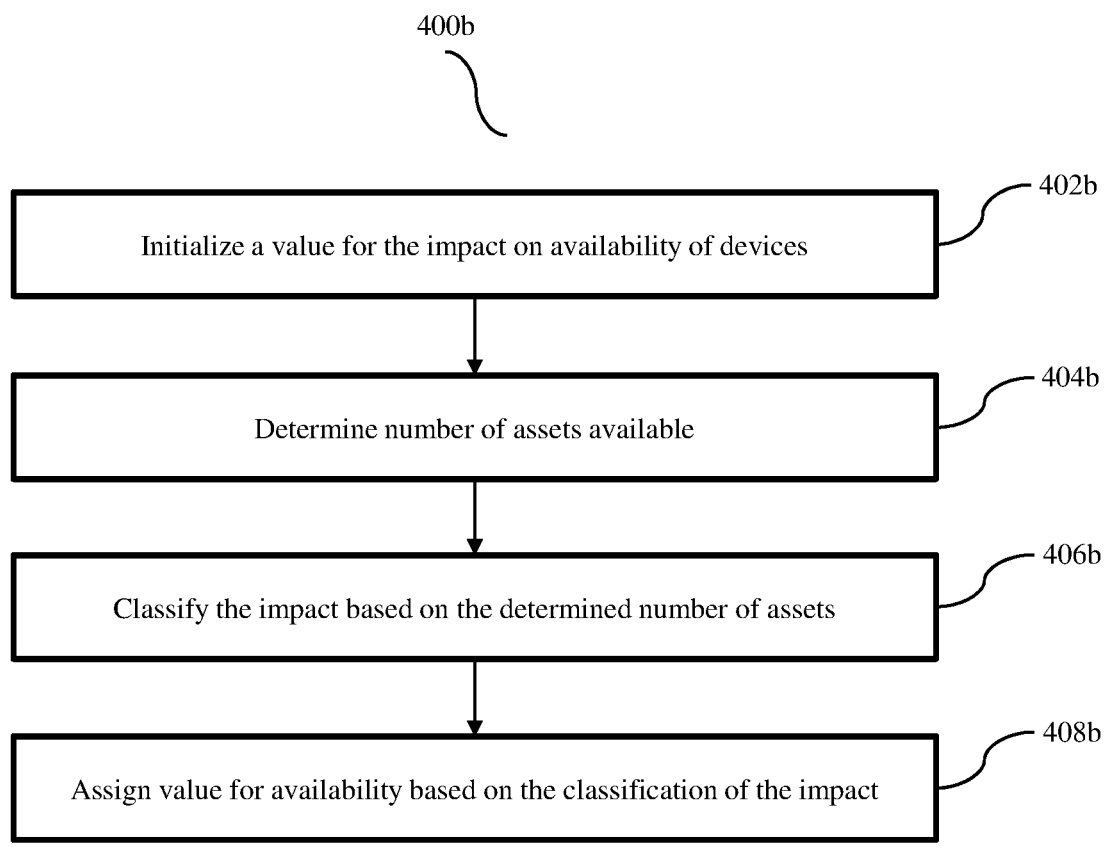
Figure 4C:
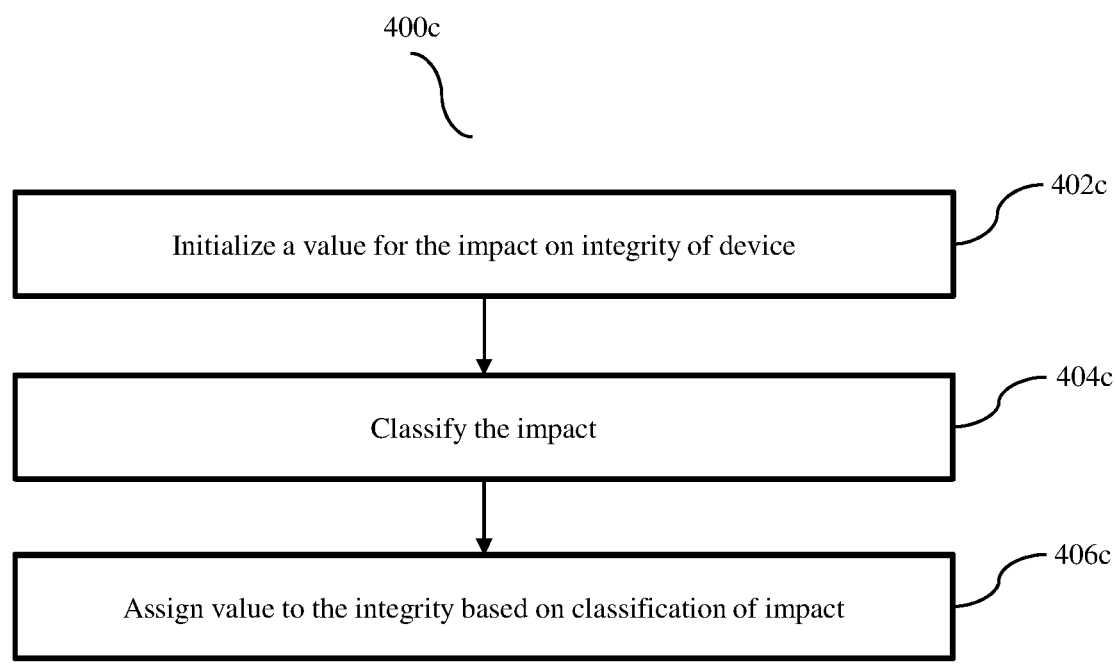

The above equation (1) includes confidentiality requirement, integrity requirement and the availability requirement which are determined by considering one or more constraints of the device, as detailed the FIGS. 4A-4C.

In an embodiment, once the vulnerability score is determined, the proposed system can be configured to notify a user of the overall risk. For example, the system can be configured to provide a report to a user that includes the overall risk. The report can include the identity of the device, the identified vulnerabilities, the risk level, the overall risk, and other relevant information. The proposed system can be configured to provide the report in any format that is accessible by the user. For example, the security tool 102 can be configured to create and output a Graphical User Interface (GUI) that includes the report 110. In some embodiments, the proposed system can be configured to determine a remediation of vulnerabilities based on the risk level, the overall risk, and additional factors that are associated with the device. For example, the proposed system can be configured to mitigate that risk which is above a determined risk threshold.

FIG. 4A is a flow chart 400a illustrating various steps for determining a confidentiality metric that describes the impact on the confidentiality of data on the device, according to an embodiment of the present invention.

The various steps in the flow chart 400a are performed by the RERM module 250. At step 402a, the method includes initializing a value for the impact on confidentiality of data. In an embodiment, the value for the impact on the confidentiality of data is initialized using the database/rule engine 240 or a National Institute of Standards and Technology (NIST) database. At step 404a, the method includes determining whether data is stored on the device. If it is determined that the data is not stored on the device, then at step 406a, the method includes determining whether the neighbor devices have stored data. If it is determined that the neighbor devices have data, then at step 408a, the method includes assigning value to confidentiality requirement as one.

In case, it is determined that the neighbor devices have no stored data, then at step 410a, the method includes assigning value to the confidentiality requirement as zero. If at step 404a, it is determined that the data is stored on the device, then at step 412a, the method includes determining whether the neighbor devices have stored data. If the neighbor devices have stored data, then at step 414a, the method includes assigning value to the confidentiality requirement as 1.5.

If the neighbor devices have no stored data, then at step 416a, the method includes assigning value to the confidentiality requirement as one.

FIG. 4B is a flow chart 400b illustrating various steps for determining an availability metric that describes the impact on the availability of the device, according to an embodiment of the present invention.

The various steps in the flow chart 400b are performed by the RERM module 250. At step 402b, the method includes initializing a value for the impact on availability of devices. In an embodiment, the value for the impact on the availability of devices is initialized using the rule engine/database 240 or the NIST database.

At step 404b, the method includes determining number of available assets or the devices. In an embodiment, business impact of the devices is determined based on the number of available assets or devices.

The number of available assets or the devices can be determined using asset utilization and number of assets of a given type of asset. (i.e., the number of available assets=asset utilization*number of assets of a given type of asset).

At step 406b, the method includes classifying the impact based on the determined number of assets or the devices. For example, if the assets available is >=70, then the business Impact is classified as Low. In case, the assets available is <70 and >=40, then the business Impact is classified Medium. Further, if the asset available is <40, then the business impact is classified as High.

At step 408b, the method includes assigning a value for availability based on the classification of the impact. For example, if the business impact is classified as High, then the availability requirement is assigned a value as 1.5. In case, the business impact is classified as Medium, then the availability requirement is assigned as 1. Further, when the business impact is classified as Low, then the availability requirement is assigned as 0.5.

FIG. 4C is a flow chart 400c illustrating various steps for determining an integrity metric that describes the impact on the integrity of the device, according to an embodiment of the present invention.

The various steps in the flow chart 400c are performed by the RERM module 250. At step 402c, the method includes initializing a value for the impact on integrity of the device. The value is initialized using the database/rule engine 240.

At step 404c, the method includes classifying the impact. The impact can be classified based on importance of the device. For example, in case of medical devices, the device impacts on patient care, (i.e., whether the device stores or transmits patient data). In another example, the device can have impact on business/operations, (i.e., to determine what would be the impact on business or operations if the device stops functioning).

At step 406c, the method includes assigning value to the integrity metric based on the classification of the impact. For example, if the impact of the device is High, then the value of the integrity requirement is assigned as 1.5. In case, when the impact of device is Medium, then the value of the integrity requirement is assigned as 1. In case, when the impact of the device is Low, then the value of integrity requirement is assigned as 0.5.

After assigning, the values for the confidentiality requirement, the availability requirement and the integrity requirement, the RERM module 250 can be configured to determine the Impact sub score (ISC) with the assigned values using the equation (1).

Further, the exploitability metric includes sub-metrics namely Attack vector, Attack complexity, privileges required and user interaction.

The exploitability metric is calculated based on the sub metrics (as mentioned above) using the following equation (2).

$$\text{Exploitability score} = W_e \times \text{Attack Vector (AV)} \times \text{Attack Complexity (AC)} \times \text{Privilege Required (PR)} \times \text{User Interaction (UI)} \quad (2)$$

Figure 5:
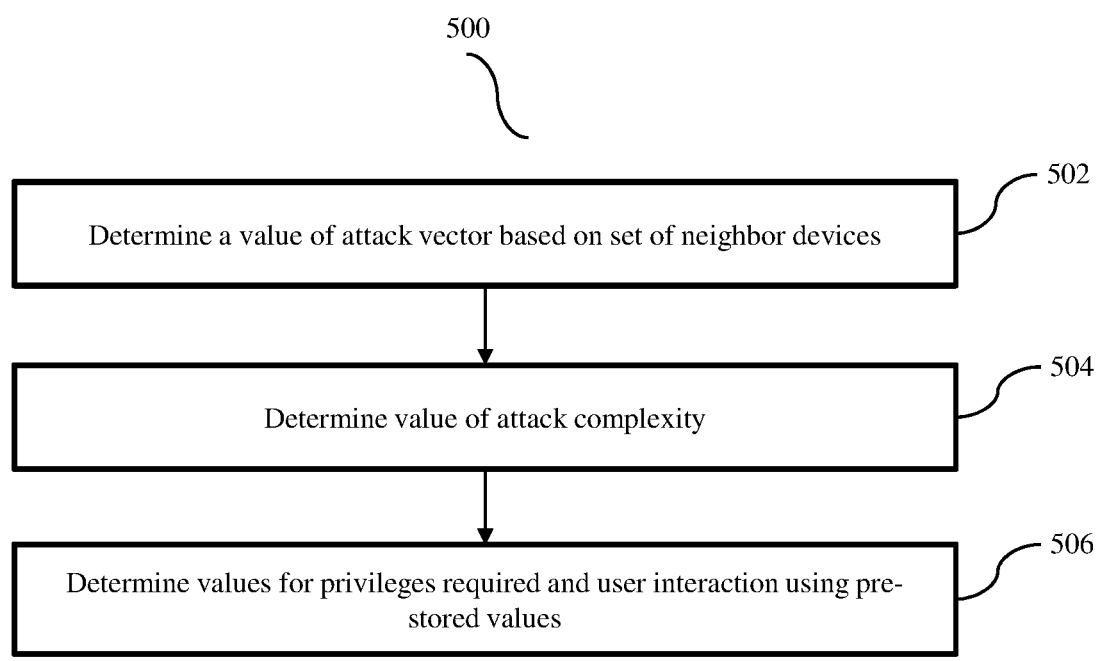
FIG. 5 is a flow chart illustrating various steps involved in computing exploitability metric for calculating the vulnerability score, according to an embodiment of the present invention.

FIG. 5 is a flow chart 500 illustrating various steps involved in computing exploitability metric for calculating the vulnerability score, according to an embodiment of the present invention. The various steps in the flow chart 400 are performed by the RERM module 250.

Initially, a value for attack vector is assigned using the rule engine 240. At step 402, the method includes determining a value of attack vector based on a set of neighbor devices. If the set of neighbor devices is fixed and in case every neighbor device has a likelihood of risk<7, then the attack vector can be assigned the value as Network, which indicates that the vulnerability may be accessed from any network that can access the device, typically the whole of the internet.

At step 504, the method includes determining value of attack complexity using a mapping table. Initially, a value for attack complexity is assigned using the database/rule engine 240. The value of attack complexity can be Medium or Low, which can be determined from the database/rule engine 240.

At step 506, the method includes determining values for privileges required and user interaction using pre-stored values. Initially, a value for privileges is assigned using the database/rule engine 240. If the user authentication indicates a single user, then the value for privileges required is assigned as Low. If the user authentication indicates multiple users, then the value for privileges required is assigned as Medium.

For user interaction, the value for user interaction is assigned using the database/rule engine 240.

After assigning, the values for the Attack vector, Attack complexity, privileges required and user interaction, the RERM module 250 can be configured to determine the exploitability score with the assigned values using the equation (2).

In an embodiment, the RERM module 250 can be configured to determine the vulnerability score using the equation as mentioned below.

$$\text{Vulnerability score} = \text{Roundup}(\text{Minimum}[(\text{Impact} + \text{Exploitability}), 10]) \quad (3)$$

In a preferred embodiment, $W_i$ and $W_e$ in equation (1) and equation (2) are computed such that equal weightage is provided for the impact and exploitability. However, in various other embodiments, they may be different depending on the needs of the enterprise.

Figure 6A:
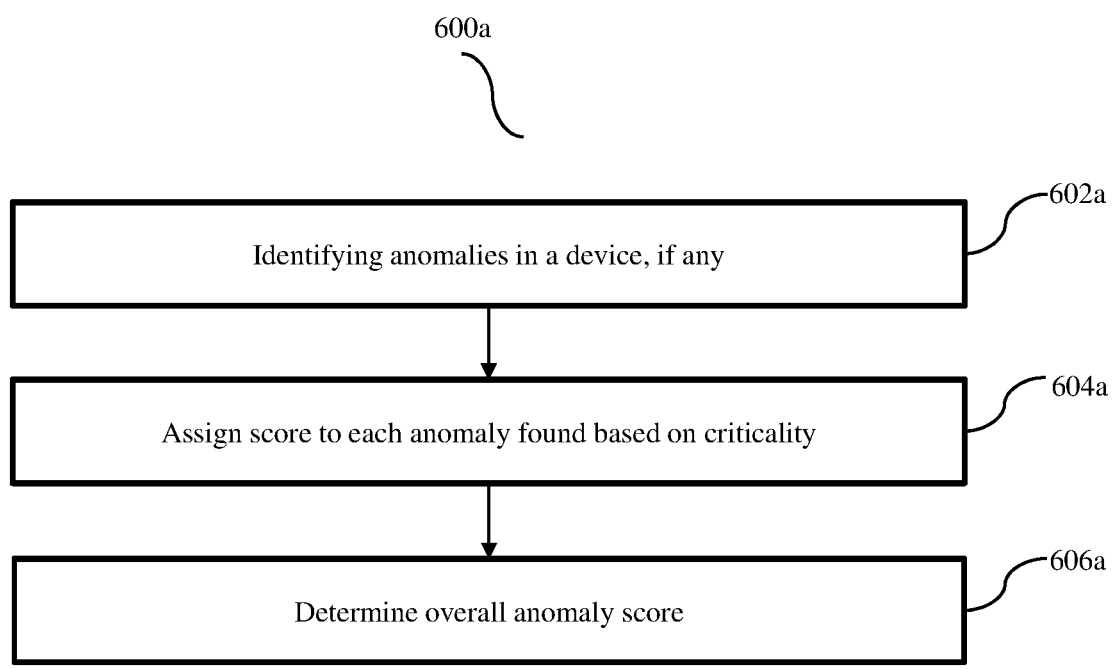
FIG. 6A and FIG. 6B are flow charts illustrating various steps involved in risk score for a device on the network to be able predict security incidents, according to an embodiment of the present invention.

FIG. 6A is a flow chart 600a illustrating various steps involved in determining anomaly score for a device, according to an embodiment herein.

At step 602a, the method involves identifying anomalies. The set of anomalies identified can be from a list of pre-defined anomalies or can be based on information extracted from sources available in public domain and in private databases.

At step 604a, the anomalies identified are each assigned an anomaly score. For example, each anomaly can be classified as HIGH, MEDIUM or LOW category anomaly. And, based on the criticality of the anomaly, a pre-defined score may be assigned for each of the categories of the anomaly. The scores are then applied to anomalies based on the category score.

At step 606a, the individual anomaly scores are then used to derive an overall anomaly score for the device. In an example, the overall score can be average of the anomaly scores.

Figure 6B:
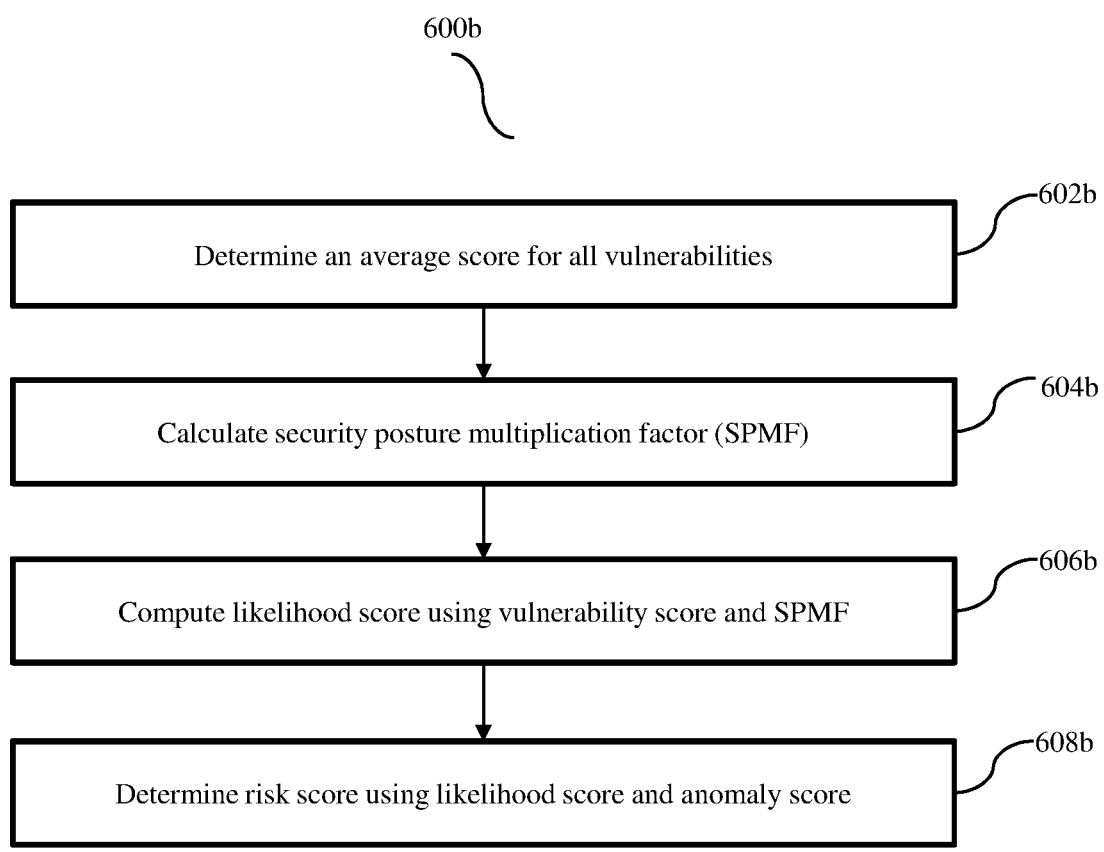

FIG. 6B is a flow chart 600b illustrating various steps involved in predicting a security incident for the device in the network, according to an embodiment of the present invention. The security incident for the device depends on the number of previous incidents of the device. The more the number of incidents, the greater is the likelihood of the device having the security incident. The various steps in the flow chart 600 are performed by the RERM module 250.

At step 602b, the method includes determining an average score for all vulnerabilities of the device. The average score for all vulnerabilities of the device can be computed based on sum of all the vulnerabilities of the device and the total number of vulnerabilities of the device.

At step 604b, the method includes calculating a security posture multiplication factor (SPMF). For calculating the SPMF, highest possible security posture score and a security posture score for the device are determined.

In an embodiment, the highest possible security posture score can be determined by identifying all potential security capabilities that can be installed on the device. For every potential security capability, a value is assigned to each capability. The highest possible security posture score is determined by adding all the assigned values.

In order to calculate the security posture score for the device, it is determined whether the security capability specifically exists for the device. If the security capability exists, then the value for security capability is obtained. Each value for specific security capability is added for determining the security posture for the device.

The SPMF can be determined as a ratio of highest possible security posture score and a security posture score for the device.

Further, at step 606b, the likelihood score representing likelihood of security incidents occurring on the device can be computed as Likelihood Score=Average Vulnerability score−(Average Vulnerability score×SPMF)

At step 608b, the method includes computing a risk score by adding a weight factor when one or more anomalies are detected on the device. For example, if there is one anomaly detected on the device over the past one month, then the Average Vulnerability score is multiplied by a weighting factor 1.1.

In another example, if more than one anomaly detected on the device over the past one month, then the Average Vulnerability score is multiplied by a weighting factor 1.5.

In case, there is no anomaly detected, then the Average Vulnerability score is multiplied by a weighting factor of 0.9. In such case, Risk score=Likelihood score×0.9.

In another embodiment, a separate anomaly score can be computed (as illustrated in FIG. 6A) and risk score can be computed as a weighted average of likelihood score and risk score. And, in another embodiment, the maximum of the two scores may be used as the risk score.

Figure 7:
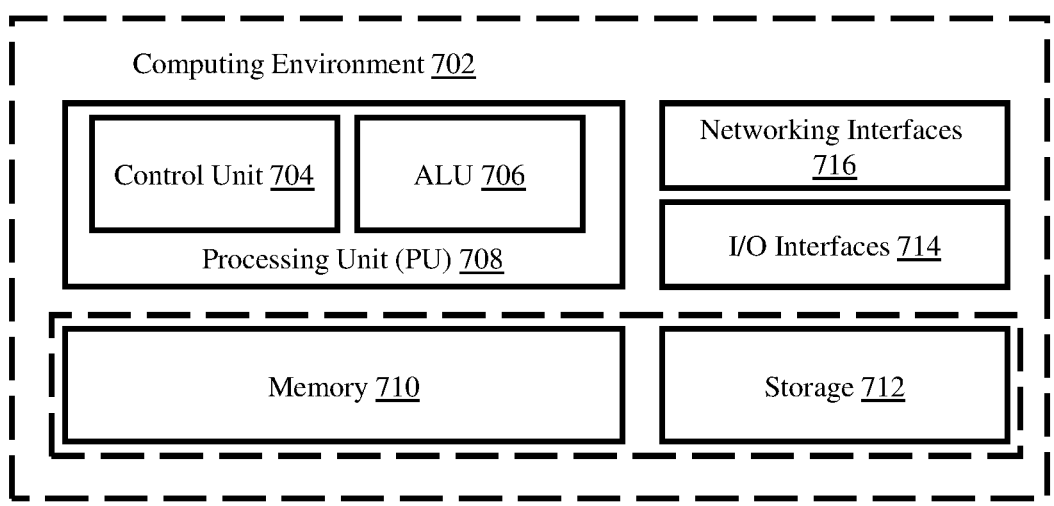
FIG. 7 illustrates a computing environment implementing the method for vulnerability management for connected devices on the network, according to an embodiment of the present invention.

FIG. 7 illustrates a computing environment implementing the system and method for vulnerability management for connected devices on the network, according to an embodiment of the proposed invention. As depicted the computing environment 702 comprises at least one processing unit 708 that is equipped with a control unit 704 and an Arithmetic Logic Unit (ALU) 706, a memory 710, a storage unit 712, plurality of networking devices 716 and a plurality Input output (I/O) devices 714. The processing unit 708 is responsible for processing the instructions of the schemes. The processing unit 708 receives commands from the control unit in order to perform its processing. Further, any logical and arithmetic operations involved in the execution of the instructions are computed with the help of the ALU 706.

The overall computing environment 702 can be composed of multiple homogeneous and/or heterogeneous cores, multiple CPUs of different kinds, special media and other accelerators. The processing unit 708 is responsible for processing the instructions of the scheme. Further, the plurality of processing units 708 may be located on a single chip or over multiple chips.

The algorithm comprising of instructions and codes required for the implementation are stored in either the memory unit 710 or the storage 712 or both. At the time of execution, the instructions may be fetched from the corresponding memory 710 and/or storage 712 and executed by the processing unit 708.

With increase in number of connected devices, the information security risk associated with the system also increases.

Various networking devices or external I/O devices may be connected to the computing environment to support the implementation through the networking interfaces 616 and the I/O interfaces 714.

The embodiments disclosed herein can be implemented through at least one software program running on at least one hardware device and performing network management functions to control the elements. The elements shown in FIGS. 1 and 7 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for vulnerability management for connected devices in a network, using an Enterprise Aggregation and Analysis Server (EAAS), said method comprising:
   analyzing data packets from said network, by an Edge Packet Collector and Processor (EPCP) module, coming from one or more devices in said network;
   identifying one or more vulnerabilities, by a Correlation Engine, in a device from said one or more devices using information from at least one among
      Cloud Aggregation Server and Knowledge Base,
      one or more external sources,
      MDS2 database, and
      internal sources;
   determining if said vulnerability affects said device, by said Correlation Engine, by applying one or more rules stored in a Rule Engine;
   calculating vulnerability score (VS), by a Risk Evaluation and Recall Monitoring (RERM) module, for said vulnerability:
   predicting one or more security incidents using said VS, by said Correlation Engine, for said device; and
   identifying one or more recommendations for remediation or mitigation of said vulnerability, by said Correlation Engine,
   wherein predicting said one or more security incidents for said device comprises:
      determining a likelihood score for said device based on vulnerability scores for said one or more vulnerabilities identified for the device;
      determining a risk score for said device based on said likelihood score, and an anomaly score for said device; and
      identifying said one or more security incidents associated with said device when risk score crosses a pre-configured threshold, and
   wherein said determination of likelihood score comprises:
      determining an average score for all vulnerabilities of said device;
      determining a security posture multiplication factor (SPMF), wherein said determination of SPMF comprises:
         calculating highest possible security posture score for said device,
         calculating actual security posture score for said device, and
         calculating the ratio of security posture score and highest possible security posture score; and
      computing a product of said average score of vulnerabilities and said SPMF.

2. The method in claim 1, where calculating VS for said vulnerability comprises:
   calculating impact metric (IM) and exploitability metric (EM);
   assigning weights Wi and We to IM and EM respectively, based on the context;
   calculating vulnerability score using IM, EM and their respective weights, using the formula:

$$VS = W_i \times IM + W_e \times EM$$

where IM is impact metric, $W_i$ is the weight for impact metric, EM is exploitability metric, and $W_e$ is the weight for exploitability metric.

3. The method in claim 2, where IM and EM are equally weighted ($W_i$ equals $W_e$) in computing the vulnerability score for enterprise devices.

4. The method in claim 2, where IM is weighted more compared to EM (Wi is more than We) in computing the vulnerability score for personal devices.

5. The method in claim 2, where IM is calculated using:

$$IM = Minimum(1-(1-CI \times CR) \times (1-II \times IR) \times (1-AI \times AR), 0.915),$$

where CI is Confidentiality Impact, CR is Confidentiality Requirement, II is Integrity Impact, IR is Integrity Requirement, AI is Availability Impact, and AR is Availability Requirement.

6. The method in claim 2, where EM is calculated using:

$$EM = AV \times AC \times PR \times UI,$$

where AV is Attack Vector, AC is Attack Complexity, PR is Privilege Required, and UI is User Interaction.

7. The method in claim 1, said method further comprising:
   identifying plurality of anomalies for said device;
   assigning scores to each of said plurality of anomalies, based on criticality of anomaly; and
   determining an overall anomaly score for said device.

8. The method in claim 1, said method further comprising:
providing a vulnerability report for said device, by said RERM module, to one or more users of EAAS, said report comprising:
identity of said device;
one or more identified vulnerabilities of said device;
vulnerability score associated with said one or more identified vulnerabilities;
recommended remediation or mitigating measures for vulnerabilities crossing a pre-configured threshold; and
the risk associated with said device.

9. The method in claim 1, where providing report includes displaying said security incidents on a graphical user interface for said one or more users.

10. The method in claim 1, where providing report includes sending a message with said security incidents to said one or more users.

11. The method in claim 9, said remediation measures can include suggestions relating to network reconfiguration for a device or a set devices of a particular group, where device group may be identified based at least one among type of devices, nature of data being accessed from devices, risk associated with devices, type of operating system on devices, and function of devices.

12. The method in claim 10, wherein said reconfiguration includes assigning said device or said group of devices to their own VLAN.

13. The method in claim 10, wherein said reconfiguration includes isolating said device or said group of devices by removing connectivity to the rest of the network.

14. The method in claim 1, where said report highlights high risk assets for user attention.

15. The method in claim 1, said method further comprising automatically mitigating risk by taking necessary action for vulnerabilities crosses a pre-configured threshold.

16. The method in claim 1, said method further comprising marking said device as high-risk asset based on vulnerability score, when said vulnerability score is crosses a pre-configured threshold.

17. The method in claim 1, said method further comprising marking said device as high-risk asset, when said device is affected by one or more of pre-identified high-risk vulnerabilities.

18. The method in claim 1, said method further comprising prioritizing high risk devices for future vulnerability assessments.

19. The method in claim 1, said method further comprising prioritizing devices marked as critical, based on user input, for vulnerability assessments.

20. The method in claim 1, further comprising:
scan for information on vulnerability from relevant sources on the Internet;
parse unstructured data from said sources and match specific patterns;
create one or more new rules based, when there is a match with the keywords or patterns;
update said Rule Engine with said one or more new rules.

21. The method in claim 1, further comprising:
analyzing other impact factors based on said vulnerability, said factors comprising:
patient impact factor;
data impact factor; and
business impact factor.

22. A system for vulnerability management for connected devices in a network, said system comprising:
an Enterprise Aggregation and Analysis Server (EAAS) configured for:
analyzing data packets from said network, by an Edge Packet Collector and Processor (EPCP) module, coming from one or more devices in said network;
identifying a vulnerability, by a Correlation Engine, in a device from said one or more devices using information from at least one among
Cloud Aggregation Server and Knowledge Base,
one or more external sources,
MDS2 database, and
internal sources;
determining if said vulnerability affects said device, by said Correlation Engine, by applying one or more rules stored in a Rule Engine;
calculating vulnerability score (VS), by a Risk Evaluation and Recall Monitoring (RERM) module, for said vulnerability:
predicting one or more security incidents using said VS, by said Correlation Engine, for said device; and
identifying one or more recommendations for remediation or mitigation of said vulnerability, by said Correlation Engine,
wherein predicting one or more security incidents for said device comprises:
determining a likelihood score for said device based on vulnerability scores for said one or more vulnerabilities identified for the device;
determining a risk score for said device based on said likelihood score, and an anomaly score for said device; and
identifying one or more security incidents associated with said device when risk score crosses a pre-configured threshold,
wherein said determination of likelihood score comprises:
determining an average score for all vulnerabilities of said device;
determining a security posture multiplication factor (SPMF), wherein said determination of SPMF comprises:
calculating highest possible security posture score for said device,
calculating actual security posture score for said device, and
calculating the ratio of security posture score and highest possible security posture score; and
computing a product of said average score of vulnerabilities and said SPMF.

* * * * *